United States Patent

Apfel et al.

Patent Number: 5,974,454
Date of Patent: Oct. 26, 1999

[54] METHOD AND SYSTEM FOR INSTALLING AND UPDATING PROGRAM MODULE COMPONENTS

[75] Inventors: Darren A. Apfel, Redmond; Michael C. Mathieu, Seattle; Lydja K. Williams, Bellevue, all of Wash.

[73] Assignee: Microsoft Corporation, Redmond, Wash.

[21] Appl. No.: 08/970,668

[22] Filed: Nov. 14, 1997

[51] Int. Cl.[6] ........................................ G06F 9/445
[52] U.S. Cl. ........................ 709/221; 709/218; 395/712
[58] Field of Search .................... 709/221, 218; 395/712

[56] References Cited

U.S. PATENT DOCUMENTS

| | | | |
|---|---|---|---|
| 5,732,275 | 3/1998 | Kullick et al. | 395/712 |
| 5,805,891 | 9/1998 | Bizuneh et al. | 395/704 |
| 5,845,077 | 12/1998 | Fawcett | 709/221 |
| 5,909,581 | 6/1999 | Park | 395/712 |

Primary Examiner—Robert B. Harrell
Assistant Examiner—Kenneth R. Coulter
Attorney, Agent, or Firm—Jones & Askew, LLP

[57] ABSTRACT

Installing and updating a software program module component. A determination is made whether the current date is on or after a date stored in a registry key on a computer. If the current date is on or after the date stored in the registry key, then a computer transmits a database query via the Internet to a database server. At the database server, a determination is made whether an upgrade package for the software program module component is available, such as by performing a database lookup. If an upgrade package for the software program module component is available, then an upgrade package message is sent from the database server to the computer. At the computer, a determination is made whether the user wants to download the upgrade package. If so, then an upgrade package query is sent by the computer via the Internet to a package server. At the package server, in response to receiving the upgrade package query, the upgrade package is retrieved and sent over the Internet to the computer. The upgrade package is then installed on the computer to update the software program module component.

17 Claims, 5 Drawing Sheets

METHOD AND SYSTEM FOR INSTALLING AND UPDATING PROGRAM MODULE COMPONENTS

TECHNICAL FIELD

This invention relates to updating software program module components or installing new software program module components. More particularly, this invention relates to updating software program module components or installing new software program module components over a distributed computer network either automatically, or manually based upon user input.

BACKGROUND OF THE INVENTION

Computer software manufacturers are often releasing new or upgraded versions of their software program modules. Oftentimes, the release of a new or upgraded version of a software program module may be to correct bugs or to add new features that were incomplete at the time of the debut of the software program module.

Many users of a program module may be unaware that new releases or upgrades to a software program module have been released. For example, a user may not see the press releases related to a new version or upgrade to a program module. Moreover, the user may not have registered their program module with the software manufacturer and, thus, the manufacturer may have no way to contact the user regarding the upgrade. Thus, there is a need in the art for a system for installing new or upgraded program module components that does not require the user to be aware of the release date of the new release or upgrade.

Manufacturing costs of upgrades and new releases may also be costly to manufacturers and consumers alike. Manufacturers must manufacture diskettes, CD-ROMs, or other data storage media to store the upgrade or new release. This manufacturing may be expensive for the manufacturers. Shipping costs are also expensive. The expense of manufacturing and shipping will typically be absorbed by the consumer and is, thus, expensive to consumers also. Thus, there is a further need in the art for a system for installing new or upgraded software program modules that does not involve the added costs of manufacturing and shipping of diskettes, CD-ROMs, or other data storage media.

Software manufacturers sometimes release program modules with features that have not been completely developed due to time constraints caused by scheduled release dates. However, the software manufacturer may know of a date in the future that these features will be completely developed. However, due to the inconvenience and expense of upgrading to the user, these features may not be included in the release until they are fully completed despite their possible usefulness to the user. Thus, there is a need in the art for a system for installing upgraded software program modules that easily, conveniently, and automatically checks for an upgraded software program module on a predetermined date.

Software manufacturers must sometimes delay, or "slip", the release date of a software program module. Thus, there is a need in the art for a system for installing upgraded software program modules that allows a software manufacturer to conveniently change, or "slip", the date on which a planned upgrade is released.

Thus, there is a need in the art for a system for installing new or upgraded program module components that does not require the user to be aware of the release date of the new release or upgrade. There is still a further need in the art for a system for installing new or upgraded software program modules that does not involve the added costs of manufacturing and shipping of diskettes, CD-ROMs, or other data storage media. There is also a need in the art for a system for installing upgraded software program modules that easily, conveniently, and automatically checks for an upgraded software program module on a predetermined date.

SUMMARY OF THE INVENTION

The present invention satisfies the above-described needs by providing a system and method for updating software program module components or installing new software program module components over a distributed computer network, such as the Internet. The update and installation tasks may be completed either automatically, or manually based upon user input.

Generally described, the present invention provides a computer-implemented method for automatically updating a software program module component stored on a computer. At the computer, a determination is made whether the current date is on or after a date stored at the computer. The current date is typically the date on the internal clock of the computer. The date, which can be stored in a registry key, is typically the date that an upgrade for the software program module component is expected to be released. If the current date is on or after the date stored in the registry key, then a database query is sent from the computer over the Internet to a database server. The database query typically is a HyperText Transfer Protocol (HTTP) query and can include information such as the version of the program module component to be upgraded, the platform that the program module component is running on, and the language of the program module component.

In response to receiving the database query, the database server determines whether an upgrade package for the software program module component is available. The database server can determine whether an upgrade package for the software program module component is available by performing a database lookup using the information included in the database query. If an upgrade package for the software program module component is available, then the database server sends over the Internet an upgrade package message to the computer. The upgrade package message typically includes the URL of a package server at which the upgrade package may be found. In response to receiving the upgrade package message, the computer may send over the Internet an upgrade package query to the package server. The upgrade package query is typically the URL of the package server received in the upgrade package message.

In response to receiving the upgrade package query, the package server may retrieve the upgrade package and send the upgrade package to the computer. The upgrade package typically includes the upgrade for the software program module component and a new date to be stored in the registry key. The new date is typically the date that the next upgrade to the software program module component is expected. After receiving the upgrade package, the computer can install the upgraded software program module component and store the new date in the registry key.

In one aspect, the database query includes the version of the software program module component stored on the computer and the Internet address of the database server. In yet another aspect, the database server and the package server may be implemented as a single server connected to the Internet.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
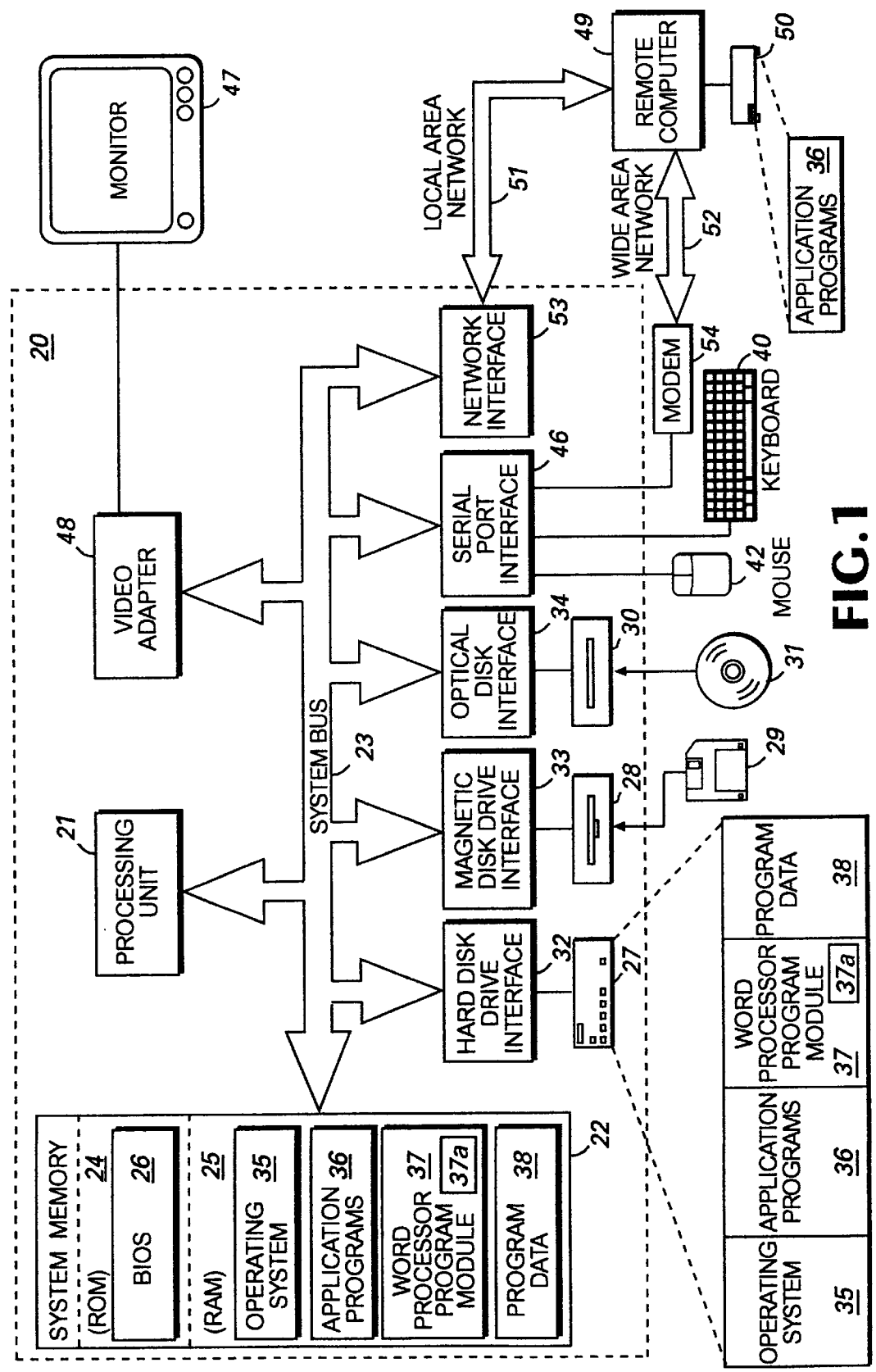
FIG. 1 is a block diagram of a computer that provides the operating environment for an exemplary embodiment of the present invention.

The present invention is directed to updating software program module components or installing new software program module components over the Internet either automatically, or manually based upon user input. In one embodiment, the invention is incorporated into a word processor application program entitled "WORD 8.0", marketed by Microsoft Corporation of Redmond, Wash. Briefly described, the "WORD 8.0" application program allows a user to create and edit electronic documents by entering characters, symbols, graphical objects, and commands. The "WORD 8.0" program module includes a Web Authoring Components program module. The Web Authoring Components are a set of tools which allows users to create Web pages. The Web Authoring Components may also include an auto-autoupdate feature. Auto-autoupdate is a cooperative scheduled client "pull" routine designed to automatically update the Web Authoring Components program module over the Internet when an upgrade becomes available. In other words, the auto-autoupdate feature automatically checks for upgrades to the Web Authoring Components program module at predetermined dates and downloads the upgrades when a new upgrade becomes available. The auto-autoupdate feature may also be manually selected by a user, such as by selecting a menu command, to check for an upgrade to the Web Authoring Components program module.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as a word processor program module 37, program data 38, and other program modules (not shown). The word processor program module 37 may include a Web Authoring Components program module 37a with an auto-autoupdate feature.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet 60, which is illustrated in FIG. 2.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet 60 (FIG. 2). The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
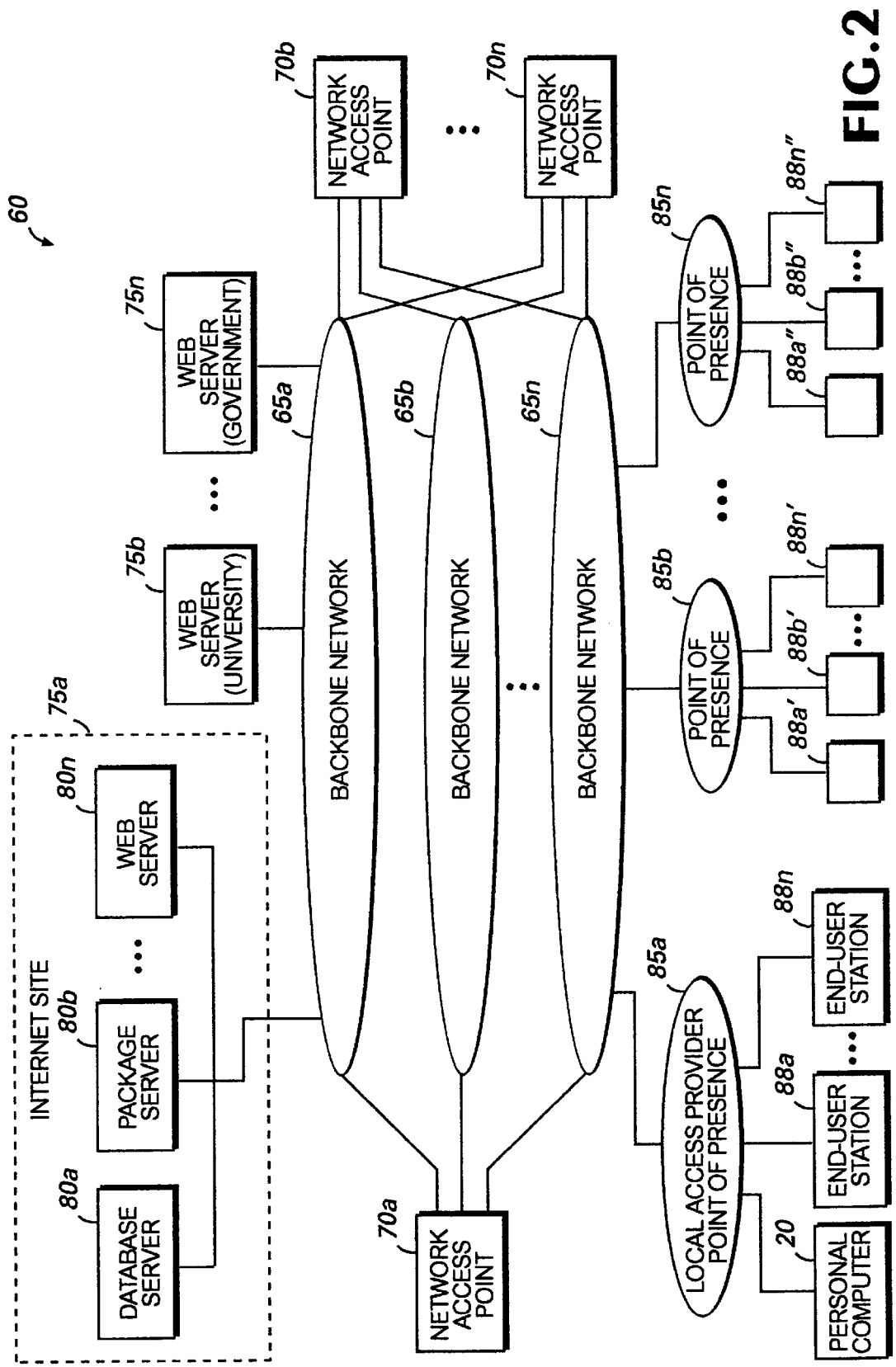
FIG. 2 is a functional block diagram of the Internet representing a portion of the operating environment of an exemplary embodiment of the present invention.

Referring now to FIG. 2, an exemplary embodiment of the present invention provides for the downloading of upgraded versions of the Web Authoring Components program module 37a to the user's computer 20 from a package server 80b via the Internet 60 which is described below in reference to FIG. 2. As will be discussed, new program module components may also be obtained from the package server 80b via the Internet 60.

FIG. 2 is a functional block diagram of the Internet 60, a distributed electronic computing network that provides a portion of the operating environment for an exemplary embodiment of the present invention. The Internet has in recent years become a mainstream commercial communication resource. E-mail and remote access to computer servers are currently widely used tools for reaching customers. The participants in the Internet are a wide variety of machines, organizations, and individuals, all able to communicate and share information. Physically, the Internet is an interconnected collection of thousands of computer networks, tens of thousands of computers, and tens of millions of individual stations operated by end-users. The user of the present invention is preferably such an end-user. As is well-known to those skilled in the art, to access an Internet site, an end-user need only transmit the site's universal resource locator (URL) created in accordance with the standardized Domain Name System (DNS).

The Internet 60 includes a plurality of backbone networks 65a through 65n. These backbone networks form an international grid of high-speed, high-capacity data communication lines interconnecting a number of massive computers that serve as large-scale processing points or nodes. The backbone networks 65 are interconnected with each other through a plurality of network access points 70a through 70n. These network access points are interfaces through which information is communicated from one backbone network to another. The configuration and operation of the Internet backbone is well-known to those skilled in the art and will not be further described herein.

The Internet 60 includes a plurality of Internet sites 75a through 75n. These Internet sites are generally operated by corporations, universities, and governmental organizations. Each Internet site may include one or more repositories of information and resources that may be accessed over the Internet. Each Internet site, as represented by the Internet site 75a, may include a plurality of web servers 80a through 80n, such as database server 80a and package server 80b. Each of these web servers may provide "home pages" to be visited, files to be read or downloaded, applications to be shared, and the like.

The Internet 60 also includes a plurality of points of presence 85a through 85n that are operated by local access providers. These local access providers are in the business of providing Internet access to end-user stations. In an exemplary embodiment of the present invention, the personal computer 20, shown in FIG. 1, is an end-user station. As shown in FIG. 2, the point of presence 85a provides Internet access to the personal computer 20 (end-user station) and other end-user stations 88a through 88n, the point of presence 85b provides Internet access to end-user stations 88a' through 88n', etc. All together, the points of presence 85 can provide Internet access to numerous end-user stations 88. Each point of presence 85, and each end-user station 88, may, but need not, provide home pages for access by others on the Internet 60.

As stated above, the personal computer 20, illustrated in FIG. 1, is also illustrated as an end-user station connected to the Internet 60, illustrated in FIG. 2. As will be understood from the following discussion, an exemplary embodiment of the present invention provides for downloading program module components maintained on an Internet-based package server 80b (FIG. 2) to the local computer 20 (FIGS. 1 and 2).

Installing and Updating Program Module Components

Figure 3:
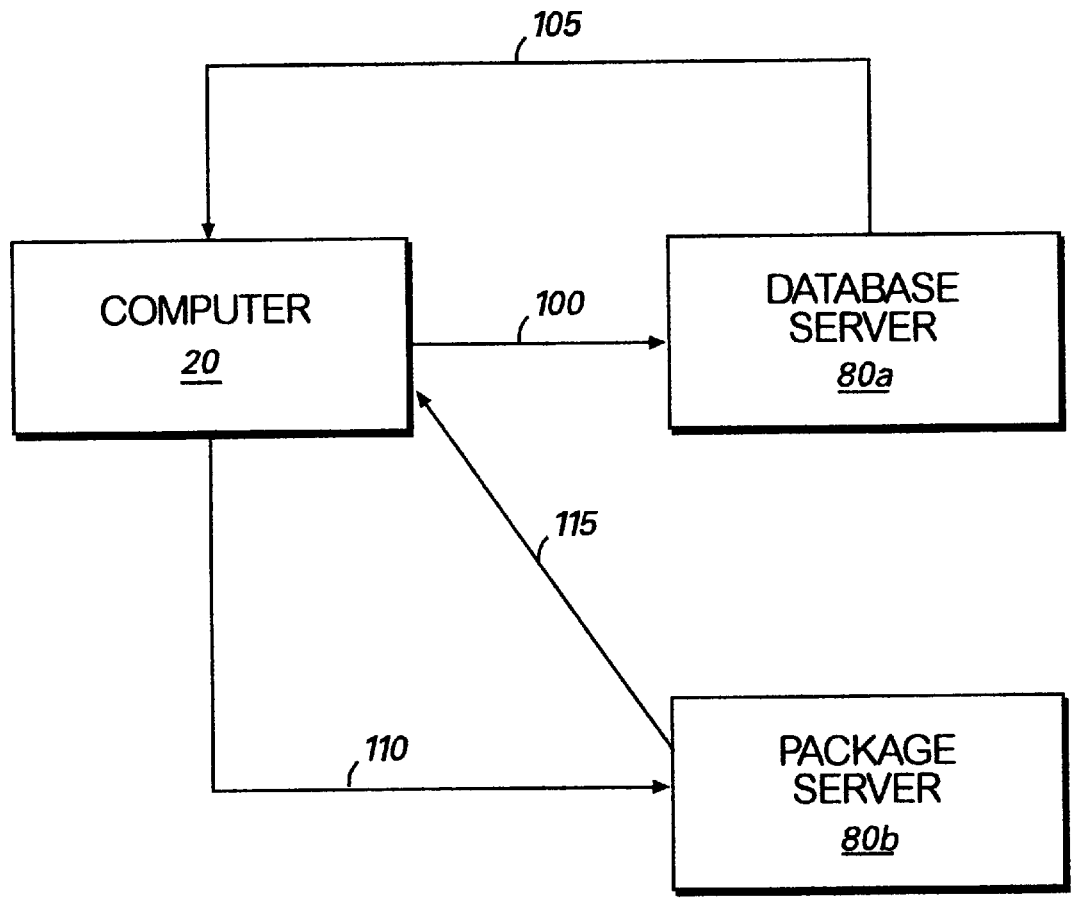
FIG. 3 is a simplified block diagram illustrating the basic components of an exemplary embodiment of the present invention.

Briefly described, the present invention can update software program module components or install new software program module components over the Internet either automatically, or manually based upon user input. FIG. 3 is a simplified block diagram illustrating the components of an exemplary embodiment of the present invention. FIG. 3 includes elements from FIGS. 1 and 2 such as computer 20, database server 80a, and package server 80b.

In an exemplary embodiment of the present invention, computer 20 sends a query 100 on or after a predetermined date over the Internet to database server 80a. It should be understood that database server 80a may be a server at any URL specified in an auto-autoupdate registry key. The URL in the auto-autoupdate registry key may be customized by a user, such as by an administrator at the time of deploying the "WORD 8.0" program module. The predetermined date is typically the date that an upgrade is expected for one or more program modules stored on computer 20. The predetermined date is typically stored in an auto-autoupdate registry key as will be further described below. The query 100 includes all of the information regarding computer 20 that the database server 80a needs to determine if an upgrade is available and, if an upgrade is available, to determine the location of the upgrade package.

After reviewing query 100, the database server 80a returns a response 105 over the Internet to the computer 20. If an upgrade is not available, the database server 80a will return a response 105 that indicates that no upgrade is available and that includes the date that an upgrade is expected. If there will be no more upgrades in the future, or if an administrator has decided to turn off the update feature of this embodiment, then the database server 80a will return a response that will deactivate the auto-autoupdate feature.

However, if an upgrade is available, then the database server 80a will send back a response 105 that includes the URL of the upgrade package. It should be understood that each configuration of computer 20 may require a different upgrade package and, therefore, a different URL. The database server 80*a* may also send back the URL of an alternative download site in case the primary download site is overloaded.

After the computer 20 receives the response 105 including the URL of the upgrade package, the computer 20 will send a query 110 to the package server 80*b* at the URL of the update package. The package server 80*b* will send the update package 115 to the computer 20 and the computer 20 will then install the update package 115.

It should be understood from the above description of an exemplary embodiment of the present invention that a server or servers capable of handling the traffic caused by this update feature must be maintained. The servers are responsible for assessing whether an upgrade is available and whether it should be downloaded based on the information sent by computer 20. For example, even if an upgrade is available, it should not be downloaded if the computer 20 already has the upgrade or if the upgrade is somehow incompatible with computer 20. The servers are further responsible for providing the download target in the form of an URL if a new upgrade is available. Providing the URL may include load balancing between servers because if a primary server has a high volume, URLs of alternate servers with the same upgrade package may be utilized. It should be further understood from the above description that the servers may also provide a "next check" date if there is not an upgrade currently available.

Having generally described an exemplary embodiment above in reference to FIG. 3, a more detailed description of an exemplary embodiment of the present invention is presented below in reference to FIGS. 4A and 4B.

Figure 4A:
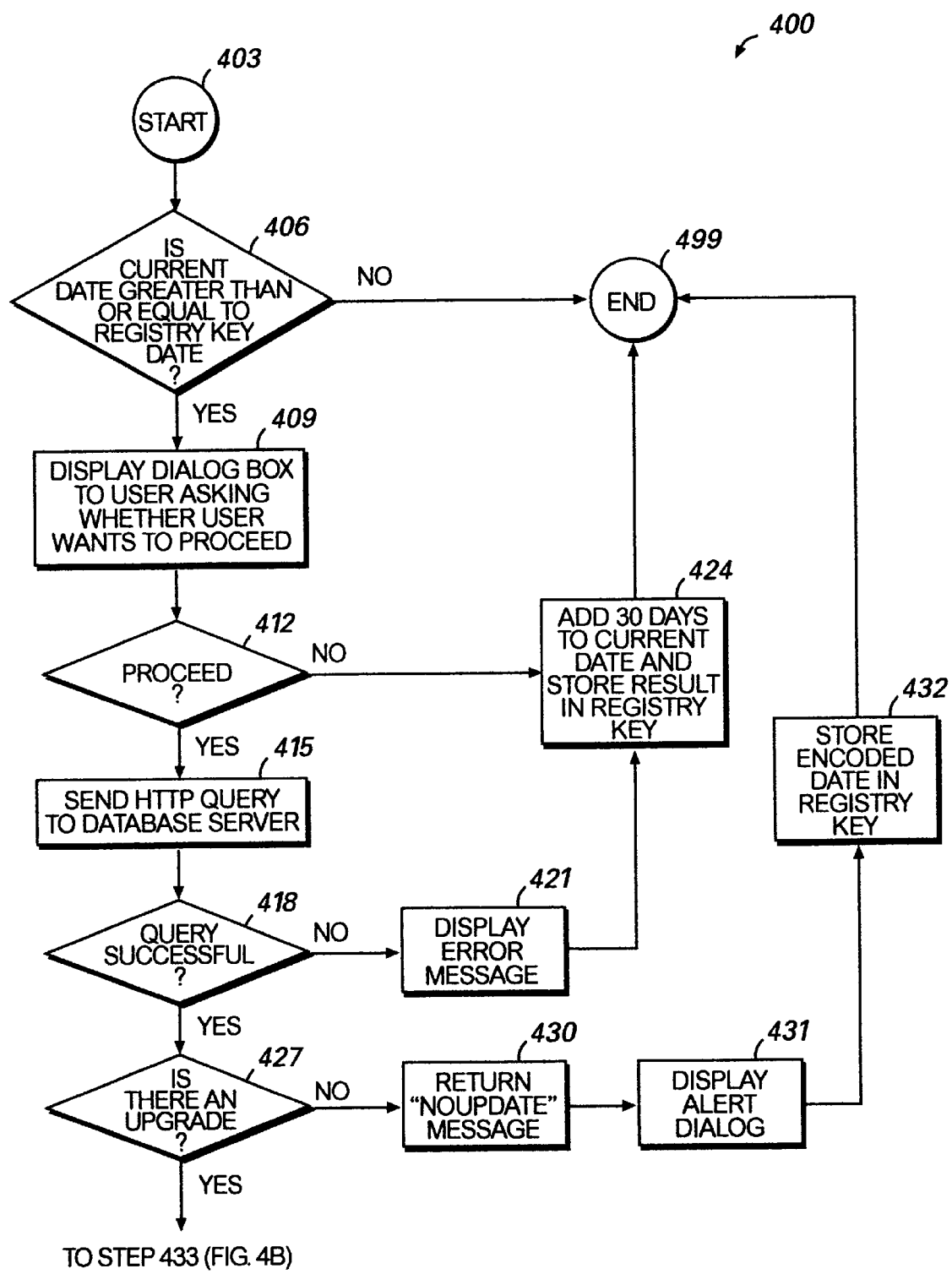
FIGS. 4A and 4B are flowcharts illustrating a method for automatically updating software program module components or installing new software program module components in accordance with an exemplary embodiment of the present invention.
Figure 4B:
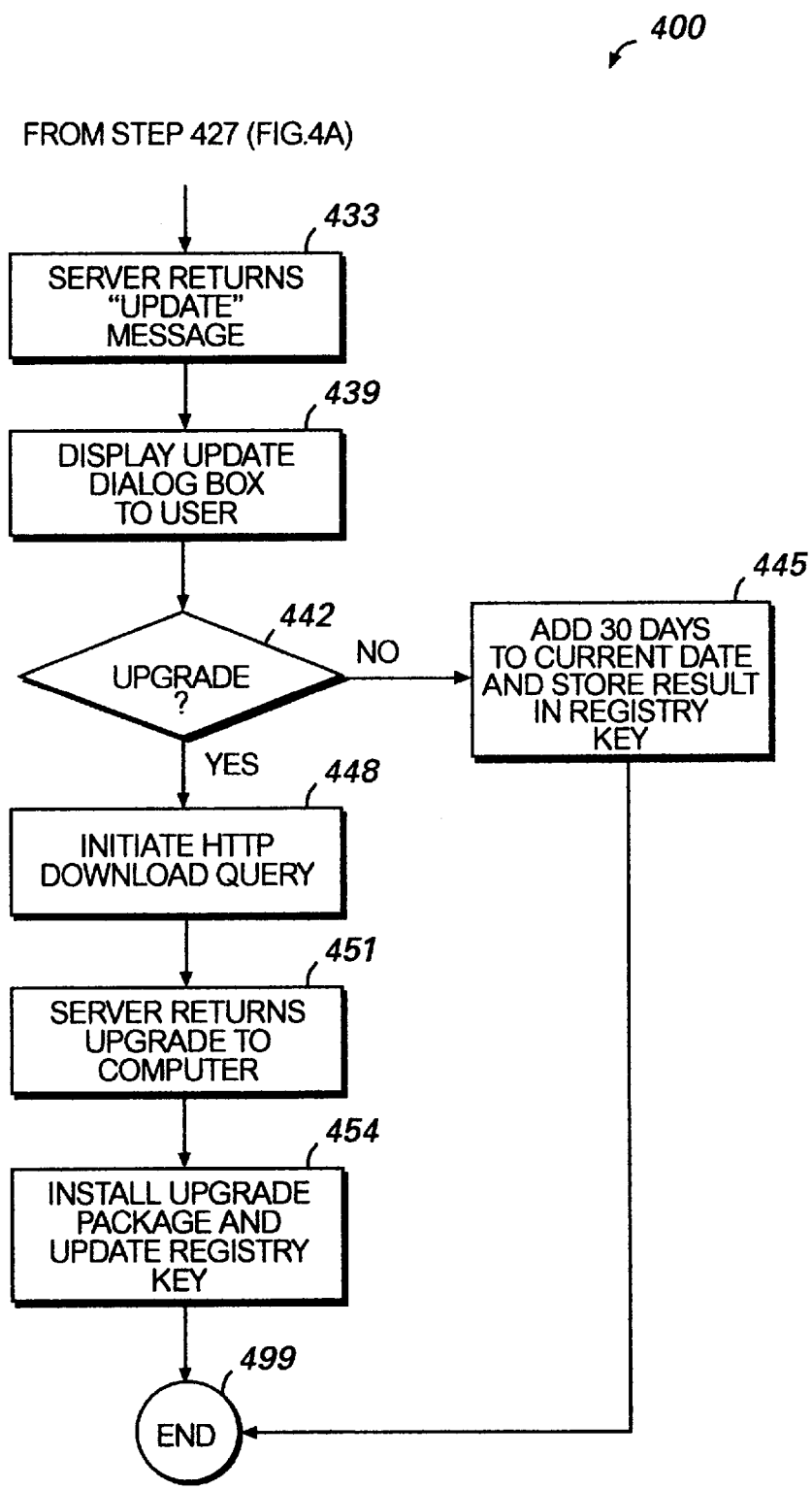

FIGS. 4A and 4B are flowcharts illustrating a method 400 for automatically updating software program module components or installing new software program module components in accordance with an exemplary embodiment of the present invention. Those skilled in the art will appreciate that this exemplary embodiment is a computer-implemented process that is carried out by the computer in response to input from the user and instructions provided by an application program module.

Referring to FIG. 4A, the method 400 begins at step 403 and proceeds to decision step 406 after the word processor program module 37 is booted and the Web Authoring Components program module 37*a* is initialized. At decision step 406, it is determined whether or not the current date is greater than or equal to a date stored in a registry key by the Web Authoring Components program module 37*a*. In the exemplary embodiment, when the Web Authoring Components program module is initially installed, a registry key will typically be set equal to the date that an upgrade to the Web Authoring Components program module is expected. The current date is the date that is maintained on the internal clock of computer 20.

If, at decision step 406, it is determined that the current date is less than the date stored in the registry key, then the method ends at step 499. However, if, at decision step 406, it is determined that the current date is greater than or equal to the date stored in the registry key, then the method proceeds to step 409. For example, suppose the date that a software producer expects an upgraded version of the Web Authoring Components program module to be available is Sep. 1, 1998. Then, the software producer will design the Web Authoring Components program module so that the date Sep. 1, 1998 is stored in the registry key when the Web Authoring Components program module is initially installed. Thus, whenever the Web Authoring Components program module is initialized before Sep. 1, 1998, no action is taken and the method ends at step 499. However, whenever the Web Authoring Components program module is initialized on or after Sep. 1998, the method proceeds to step 409.

At step 409, a dialog box is displayed to the user on monitor 47 warning that a dial-up connection to the Internet is necessary to proceed with upgrading the Web Authoring Components program module and asking whether the user wants to proceed. The user may either select to proceed with attempting to upgrade the Web Authoring Components program module or select to terminate the upgrade attempt, such as by selecting a checkbox or yes/no buttons in the dialog box with mouse 42. Step 409 is typically performed to warn the user that a dial-up connection to the Internet is necessary.

After the user selects either to proceed or to terminate at step 409, the method proceeds to decision step 412. At decision step 412, it is determined whether the user selected to proceed with the dial-up connection. If so, then the method proceeds to step 415. If not, then the method proceeds to step 424. At step 424, 30 days is added to the current date to determine a next check date to be stored in the registry key. This next check date is then stored in the registry key. Thus, the next check date stored in the registry key will prevent the auto-autoupdate feature from being automatically initiated again until 30 days from the current date. After step 424, the method ends at step 499. It should also be understood that the user has the option of selecting a checkbox that reads "Don't ask me again". When this checkbox is selected, all future auto-autoupdate actions are disabled, preferably by setting the date in the registry key equal to "−1". If not, then the method ends at step 499.

Still referring to FIG. 4A, at step 415, a HyperText Transfer Protocol (HTTP) query is initiated and sent from computer 20 over the Internet to the database server 80*a*. The HTTP query may be sent asynchronously so that the user may perform other tasks while the query is being sent. To construct the query, information about the setup of computer 20 is appended to a HTTP Internet address stored in the form of a standard HTTP query. The HTTP Internet address is typically stored when the Web Authoring Components program module is initially installed. However, it should be understood that this Internet address may be edited to direct the query to an internal server, such as if an administrator would like to control upgrades internally rather than over the Internet. The query is structured to identify the information needed to determine which upgrade package URL is required by computer 20. This information may include the versions of the program module components to be upgraded, the platform that the program module components are running on, and the language of the program module components. In an exemplary embodiment, the appended information will typically include the version of the Web Authoring Components program module 37*a*, the version of a HTML converter in the word processor program module 37, the version of the word processor program module 37, the localization language, and the type of operating system on computer 20. For example, the query may appear as follows:

```
http://www.microsoft.com/~word/internet/update.i
dc?Ver=8.0&IAVer=3.0&Lang=English&
Platform=Win&FreeSpaceC=40234&FreeSpaceD
=10234
```

After the HyperText Transfer Protocol (HTTP) query is initiated and sent over the Internet to the database server 80a at step 415, the method then proceeds to decision step 418.

At decision step 418, it is determined whether the HTTP query was successful in contacting database server 80a. If it is determined that the HTTP query was unsuccessful, such as if the HTTP query times out or fails, then the method proceeds to step 421.

At step 421, an error message is displayed to the user on monitor 47 explaining that the upgraded version of the Web Authoring Components program module could not be checked for and providing an explanation for the problem if possible. The method then proceeds to step 424. At step 424, 30 days is added to the current date to determine a next check date to be stored in the registry key. This next check date is then stored in the registry key. Thus, the next check date stored in the registry key will prevent the auto-autoupdate feature from being automatically initiated again until 30 days from the current date. After step 424, the method ends at step 499.

However, if at decision step 418 it is determined that the HTTP query was successful, then the method proceeds to decision step 427. At decision step 427, it is determined whether there is an upgrade package for the Web Authoring Components program module. In the exemplary embodiment, the database server 80a uses the information received in the HTTP query at step 415 to determine if an upgrade package is available, such as by a database lookup. Different update packages may be provided for different version combinations, different operating systems, and different languages. Thus, the database server 80a maintains a database of upgrade packages and corresponding configurations which should result in their download. If, at decision step 427, it is determined that an upgrade is not available, then the method proceeds to step 430.

At step 430, the database server 80a returns a "NOUPDATE" message over the Internet to the computer 20. In the exemplary embodiment, the "NOUPDATE" message typically is an HTTP message that includes the key word "NOUPDATE" followed by an encoded date. The encoded date will be the new date that the upgrade of the Web Authoring Components program module is expected. The encoded date may also be slightly randomized to prevent user traffic from overloading the database server 80a and package server 80b. From the foregoing, it should be understood that if there is not an upgrade available, then the database server 80a may control when the computer 20 automatically tries to upgrade the Web Authoring Components program module again. When there is no upgrade available, the database server 80a will send the computer 20 an encoded date. The computer 20 will not automatically query the database server 80a again until on or after the encoded date. A small random number may be added to the new date that an upgrade is expected to arrive at the encoded date. This randomization helps balance the server load since the upgrade may result in heavy server traffic on the scheduled query date.

Still referring to FIG. 4A, at step 431, an alert dialog box is displayed on monitor 47 to alert the user that an upgrade was not found for the Web Authoring Components program module. After the user acknowledges the alert dialog box, the method proceeds to step 432. At step 432, the encoded date received in the "NOUPDATE" message is stored in the registry key. After the encoded date received in the "NOUPDATE" message is stored in the registry key at step 432, the method ends at step 499.

However, if at decision step 427 it is determined that a new upgrade is available, then the method proceeds to step 433 (FIG. 4B). Referring now to FIG. 4B, at step 433, the database server 80a returns an "UPDATE" message over the Internet to the computer 20. The update message may include the URL of the update package and upgrade prompt text. A typical "UPDATE" message may appear as follows:

```
UPDATE&"A+new+version+of+Word's+Internet
+Publishing+Package+is+available.++Do+you+
wish+to+update+Word+now?&ftp.microsoft.com/
~word/internet/win/english/latest.zip
```

After the database server 80a returns an "UPDATE" message to the computer 20 at step 433, the method then proceeds to step 439.

At step 439, an update dialog box is displayed on monitor 47. The update dialog box may display the upgrade prompt text passed with the "UPDATE" message. For example, the new update dialog may display the following upgrade prompt text:

"A new version of Word's Internet Publishing Package is available. Do you wish to update Word now?"

The user may either select to upgrade the Web Authoring Components program module or select to terminate the upgrade attempt, such as by selecting a checkbox or yes/no buttons in the dialog box with mouse 42.

The method then proceeds to decision step 442 after the user selects either to proceed or to terminate. At decision step 442, it is determined whether the user selected to upgrade the Web Authoring Components program module 37a. If it is determined that the user did not select to upgrade the Web Authoring Components program module, then the method proceeds to step 445.

At step 445, 30 days is added to the current date to determine a next check date to be stored in the registry key. This next check date is then stored in the registry key. Thus, the next check date stored in the registry key will prevent the auto-autoupdate feature from being automatically initiated again until 30 days from the current date. After step 445, the method ends at step 499.

However, if at decision step 442 it is determined that the user did select to update the Web Authoring Components program module, then the method proceeds to step 448. At step 448, a HTTP download query is initiated and sent by computer 20 over the Internet to package server 80b to begin downloading the upgrade package. For example, the typical HTTP download query may appear as follows:

"ftp://ftp.microsoft.com/~word/internet/win/english/latest.zip"

After the HTTP download query is initiated and sent at step 448, the method proceeds to step 451. The HTTP download query is sent to the URL of the upgrade package returned in the "UPDATE" message at step 433.

At step 451, the package server 80b returns an executable upgrade package over the Internet to the computer 20 and the upgrade package is downloaded. The upgrade package typically includes the upgrade to the Web Authoring Components program module and a new date to be stored in the registry key. After the upgrade package is downloaded, the method proceeds to step 454.

At step 454, the upgrade package is installed on computer 20. As part of the installation procedure, the new date to check for the next upgrade is stored in the registry key. This new date may be randomized so that the server is not overloaded. It should be understood that the upgrade package will be designed to decompress itself and automatically install the update to the Web Authoring Components program module.

After the upgrade package is installed at step 454, the method ends at step 499.

It should be understood that rather than including the URL of the upgrade package, the "UPDATE" message of step 431 may include the URL of a Web page, a text document, or any valid URL. For example, the URL in the "UPDATE" message may point to a Web page (e.g., http://www.microsoft.com/office/freestuff/download.html) or to a text document (e.g., http://www.microsoft.com/office/freestuff/readme.txt). Thus, in an alternative embodiment, a Web page may be opened in which the user may choose to download and install an updated program module rather than automatically downloading the updated program module.

From the foregoing description, it will be apparent to those skilled in the art that the present invention provides a method and system for automatically updating a program module component over the Internet. It will further be apparent to those skilled in the art that the present invention provides a method and system for updating a program module component over the Internet based upon a user instruction to update, such as by the user selecting a menu option to update the program module component.

Although the present invention has been described above in reference to a database server and a package server, it should be understood that the present invention may be implemented with one server or a number of servers. It should still be further understood that an administrator may customize the URL of the query at deployment time so that the components can be upgraded from a location internally rather than through a remote server. In other words, the present invention may also be implemented by a MIS director or administrator over a corporate intranet rather than the global Internet.

It should still be further understood that the auto-autoupdate feature may be disabled. The process may be disabled remotely from the database or package server or by an internal administrator of computer 20. For example, it should be understood that the present invention may be turned off at deployment time by setting the registry key equal to "−1". It can also be disabled if the database server returns a "−1" with the "NOUPDATE" message.

It should also be understood that, in an alternative embodiment, the present invention may also be implemented entirely in the background without a dialog box being displayed to the user. For example, on a specified date, an HTTP query may automatically be initiated in the background. This query will be initiated at boot time only if an active Internet connection exists. If the query times out, or fails, or a "NOUPDATE" message is returned, there will be no action. The user will not even know that the query had been initiated. If a new version is available, the user will be prompted and may choose to automatically apply the update.

In still another embodiment, the present invention may include a new menu command. Selection of this menu command will initiate the HTTP query to check for a later version. If it fails, a dialog is displayed with the failure. If the version available on the server is older than or the same as the user's version, a dialog would be displayed informing the user, "You already have the latest version of Microsoft Word's Internet Publishing package".

It should also be understood that, although the present invention has been described above in reference to upgrades to the Web Authoring Components program module, the present invention may be used to provide an upgrade to any program module or program module component. It should also be understood that the present invention may be used to download a new program module or new program module component.

Although the present invention has been described above as implemented in the application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for updating a software program module component stored on a computer, the method comprising the steps of:

determining whether the current date is on or after a date stored at the computer;

if the current date is on or after the date stored at the computer, then sending a database query from the computer to a database server;

responsive to the database query, determining at the database server whether an upgrade package for the software program module component is available;

if an upgrade package for the software program module component is available, then sending an upgrade package message from the database server to the computer;

responsive to the upgrade package message, sending an upgrade package query from the computer to a package server; and in response to receiving the upgrade package query, retrieving the upgrade package at the package server and sending the upgrade package to the computer.

2. The method recited in claim 1 wherein the current date is the date maintained on an internal clock of the computer.

3. The method recited in claim 1 wherein the database query is a HyperText Transfer Protocol (HTTP) query.

4. The method recited in claim 3 wherein the database query comprises the version of the software program module component stored on the computer and the Internet address of the database server.

5. The method recited in claim 1 wherein the step of determining whether an upgrade package for the software program module component is available comprises comparing the database query to a database lookup table.

6. The method recited in claim 1 wherein the database server and package server are implemented by a single server.

7. The method recited in claim 1 wherein the date stored at the computer is stored in a registry key.

8. The method recited in claim 3 wherein a universal resource locator (URL) of the HTTP query is stored in a registry key.

9. A method for updating a software program module component stored on a computer, the method comprising the steps of:

at the computer:

determining whether the current date is on or after a date stored in a registry key;

if the current date is on or after the date stored in the registry key, then determining whether the user wants to proceed;

if so, then sending a database query to a database server;

determining whether the database query was successful;

if the database query was successful, then at the database server:
  determining whether an upgrade package for the software program module component is available;
  if an upgrade package for the software program module component is available, then sending an upgrade package message to the computer;

at the computer:
  in response to receiving the upgrade package message, determining whether the user wants to download the upgrade package;
  if so, then sending an upgrade package query to a package server; and at the package server:
  in response to receiving the upgrade package query, retrieving the upgrade package and sending the upgrade package to the computer.

10. A computer-readable medium having computer-executable instructions for performing the steps recited in claim 9.

11. The method recited in claim 9 wherein the database server and package server are implemented by a single server.

12. The method recited in claim 9 wherein the step of sending a database query to a database server comprises sending a database query from the computer to the database server over a distributed computer network;
  wherein the step of sending an upgrade package message to the computer comprises sending an upgrade package message from the database server to the computer over the distributed computer network;
  wherein the step of sending an upgrade package query to a package server comprises sending an upgrade package query from the computer to the package server over the distributed computer network; and
  wherein the step of sending the upgrade package to the computer comprises sending the upgrade package from the package server to the computer over the distributed computer network.

13. The method recited in claim 9 further comprising the steps of:
  retrieving an upgrade program module from the upgrade package; and
  installing the upgrade program module on the computer.

14. The method recited in claim 13 further comprising the steps of:
  retrieving a new date from the upgrade package; and
  storing the new date in the registry key.

15. A system for updating a software program module component stored on a computer, the system comprising:
  the computer, a database server, and a package server, wherein the computer, the database server, and the package server are connected to a distributed computer network; and
  wherein the computer is operative:
    to determine whether the current date is on or after a date stored at the computer;
    if the current date is on or after the date stored at the computer, then to send a database query from the computer to a database server over the distributed computer network;
  wherein the database server is operative:
    responsive to the database query, to determine whether an upgrade package for the software program module component is available;
    if an upgrade package for the software program module component is available, then to send an upgrade package message to the computer over the distributed computer network;
  wherein the computer is further operative:
    responsive to the upgrade package message, to send an upgrade package query to a package server over the distributed computer network; and
  wherein the package server is operative:
    in response to receiving the upgrade package query, to retrieve the upgrade package and to send the upgrade package to the computer over the distributed computer network.

16. The system recited in claim 15, wherein the distributed computer network is the Internet.

17. The system recited in claim 15, wherein the distributed computer network is an intranet.

* * * * *